US012785118B2

(12) United States Patent
Yu et al.

(10) Patent No.: US 12,785,118 B2
(45) Date of Patent: Nov. 3, 2026

(54) METHOD OF INSPECTING AN ADHESION PORTION IN A HYDROGEN FUEL CELL AND AN ELECTRICITY-GENERATING ASSEMBLY AND CELL FRAME ASSEMBLY USED THEREFOR

(71) Applicants: HYUNDAI MOTOR COMPANY, Seoul (KR); KIA CORPORATION, Seoul (KR)

(72) Inventors: Seung Ah Yu, Yongin-si (KR); Sun Il Kim, Seoul (KR); Myung Young An, Incheon (KR); Hyun Gak Yang, Daejeon (KR); Han Hyung Lee, Goyang-si (KR); Young June Park, Yangseo-myeon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 620 days.

(21) Appl. No.: 18/231,021

(22) Filed: Aug. 7, 2023

(65) Prior Publication Data

US 2024/0192149 A1 Jun. 13, 2024

(30) Foreign Application Priority Data

Dec. 8, 2022 (KR) ........................ 10-2022-0170594

(51) Int. Cl.

| | |
|---|---|
| ***H01M 8/0286*** | (2016.01) |
| ***H01M 8/0273*** | (2016.01) |
| ***H01M 8/0284*** | (2016.01) |
| ***H01M 8/1004*** | (2016.01) |

(52) U.S. Cl.
CPC ....... *H01M 8/0286* (2013.01); *H01M 8/0273* (2013.01); *H01M 8/0284* (2013.01); *H01M 8/1004* (2013.01); *C09J 2203/33* (2013.01); *C09J 2301/408* (2020.08); *G01N 2223/401* (2013.01)

(58) Field of Classification Search
CPC ......... G01N 23/04; C09J 11/08; C09J 169/00; C09J 175/04; H01M 8/0273; H01M 8/0284; H01M 8/0286; H01M 8/1004
See application file for complete search history.

(56) References Cited

U.S. PATENT DOCUMENTS

| | | | | |
|---|---|---|---|---|
| 2006/0141332 A1* | 6/2006 | Cortright | ............ | H01M 8/2483 429/458 |
| 2008/0311457 A1* | 12/2008 | Andreas-Schott | .. | H01M 8/2483 429/513 |

FOREIGN PATENT DOCUMENTS

| | | | |
|---|---|---|---|
| JP | 4277715 B2 | * | 6/2009 |
| JP | 2021118101 A | * | 8/2021 |

OTHER PUBLICATIONS

JP_2021118101 English Translation (Year: 2021).*
JP_4277715 English Translation (Year: 2009).*

* cited by examiner

*Primary Examiner* — Jimmy Vo
(74) *Attorney, Agent, or Firm* — Lempia Summerfield Katz LLC

(57) ABSTRACT

Disclosed is a non-destructive inspection method capable of effectively evaluating adhesion quality of an adhesion portion formed between a cell frame and an EGA without damage to parts or deterioration in durability or adhesiveness of parts. In addition, an EGA-cell frame assembly capable of effectively evaluating adhesion quality of an adhesion portion formed between a cell frame and an EGA by the non-destructive inspection method is provided.

12 Claims, 3 Drawing Sheets

METHOD OF INSPECTING AN ADHESION PORTION IN A HYDROGEN FUEL CELL AND AN ELECTRICITY-GENERATING ASSEMBLY AND CELL FRAME ASSEMBLY USED THEREFOR

CROSS-REFERENCE TO RELATED APPLICATION

This application claims, under 35 U.S.C. § 119(a), the benefit of priority from Korean Patent Application No. 10-2022-0170594, filed on Dec. 8, 2022, the entire contents of which are incorporated herein by reference.

BACKGROUND

(a) Technical Field

The present disclosure relates to a method of inspecting an adhesion portion between an electricity-generating assembly (EGA) and a cell frame in an EGA-cell frame assembly provided in a hydrogen fuel cell in a non-destructive manner and an EGA-cell frame assembly used therefor.

(b) Background Art

A hydrogen fuel cell is a fuel cell that uses, as a power source, electric charges generated through reaction of hydrogen serving as a fuel and oxygen.

A hydrogen fuel cell is configured to include an electricity-generating assembly (EGA) in which a membrane electrode assembly (MEA) and a gas diffusion layer (GDL) are bonded to each other in order to generate electricity from hydrogen. The EGA is bonded to a cell frame made of a polymer resin to form an EGA-cell frame assembly or a unitized fuel cell (UFC). A stack for a hydrogen fuel cell is formed by stacking hundreds of EGA-cell frame assemblies or UFCs.

The cell frame and the EGA are compressed and bonded at an appropriate temperature and pressure after application of an adhesive therebetween. The adhesion portion between the cell frame and the EGA is regarded as very important for internal hermeticity of the stack. When the cell frame is made of a transparent material, the state of the adhesion portion may be observed to some extent with the naked eye, but the criteria for determining adhesion quality of the adhesion portion by visual inspection are very ambiguous. Also, when the cell frame is made of an opaque material, it is difficult to visually observe the state of the adhesion portion, and upon application of external force to observe the state of adhesion, parts such as GDL and the like may be damaged or adhesiveness thereof may be deteriorated, which is undesirable.

JP 4277715 B2 discloses a method of inspecting the state of an adhesive based on the X-ray detection image by adding a zinc compound, which is an X-ray detection material, to the adhesive. However, since the adhesive is in contact with the MEA in the EGA-cell frame assembly or UFC, when a metallic additive is added to the adhesive as in JP 4277715 B2, the dissolved metal ions may weaken durability of the MEA. Therefore, research and development on a non-destructive inspection method capable of effectively evaluating the extent of adhesion between the cell frame and the EGA after the bonding process between the cell frame and the EGA is urgently needed.

SUMMARY OF THE DISCLOSURE

An object of the present disclosure is to provide a non-destructive inspection method capable of effectively evaluating the extent of adhesion between a cell frame and an electricity-generating assembly (EGA) after a bonding process between the cell frame and the EGA.

Another object of the present disclosure is to provide an EGA-cell frame assembly capable of effectively evaluating adhesion quality of an adhesion portion provided in an EGA-cell frame assembly.

The objects of the present disclosure are not limited to the foregoing. The objects of the present disclosure should be able to be clearly understood through the following description and to be realized by the means described in the claims and combinations thereof.

An embodiment of the present disclosure provides a method of inspecting an adhesion portion in a hydrogen fuel cell, including providing an EGA-cell frame assembly by applying an adhesive mixed with polymer particulates between an EGA and a cell frame and then subjecting the EGA and the cell frame to thermocompression, imaging a shape of the polymer particulates in an adhesion portion by passing X-rays through the adhesion portion formed between the EGA and the cell frame, and evaluating adhesion quality of the adhesion portion based on the shape of the polymer particulates.

In providing the EGA-cell frame assembly, the polymer particulates having an average particle diameter of 10 to 20 μm may be mixed in the adhesive and then the adhesive may be applied onto one surface of the cell frame and/or one surface of the EGA.

The adhesive may be a film-type adhesive sheet, a hot-melt adhesive, or a UV-curable adhesive.

The polymer particulates may be polymethyl methacrylate (PMMA), polyphenylene oxide (PPO), polycarbonate (PC), or cycloolefin copolymer (COC).

In the method, evaluating the adhesion quality of the adhesion portion may include a first evaluation step of evaluating whether a difference between a maximum particle diameter and a minimum particle diameter among the polymer particulates imaged in imaging the shape of the polymer particulates satisfies a first criterion, and a second evaluation step of evaluating whether a difference between an average particle diameter of the polymer particulates imaged in imaging the shape of the polymer particulates and an average particle diameter of the polymer particulates provided in the adhesive satisfies a second criterion.

The second evaluation step may be performed when the first evaluation step is satisfied.

In imaging the shape of the polymer particulates, when X-rays are radiated onto a lateral surface of the EGA-cell frame assembly, whether the first criterion and the second criterion are satisfied may be evaluated based on a short-axis diameter of the polymer particulates.

In imaging the shape of the polymer particulates, when X-rays are radiated onto an upper surface or a lower surface of the EGA-cell frame assembly, whether the first criterion and the second criterion are satisfied may be evaluated based on a long-axis diameter of the polymer particulates.

The adhesive may not include a metallic additive.

Another embodiment of the present disclosure provides an EGA-cell frame assembly, including: an EGA including a membrane electrode assembly (MEA) and a gas diffusion layer (GDL): a cell frame including a polymer resin: and an adhesion portion bonding the EGA and the cell frame to each other, in which the adhesion portion may include an adhesive and polymer particulates mixed with the adhesive.

The polymer particulates in the adhesion portion may have a compressed shape when viewed in cross-section.

The adhesion portion may not include a metallic additive.

BRIEF DESCRIPTION OF THE DRAWINGS

The above and other features of the present disclosure are described below in detail with reference to certain embodiments thereof illustrated in the accompanying drawings, which are given hereinbelow by way of illustration only, and thus are not limitative of the present disclosure, and wherein.

DETAILED DESCRIPTION

Figure 1:
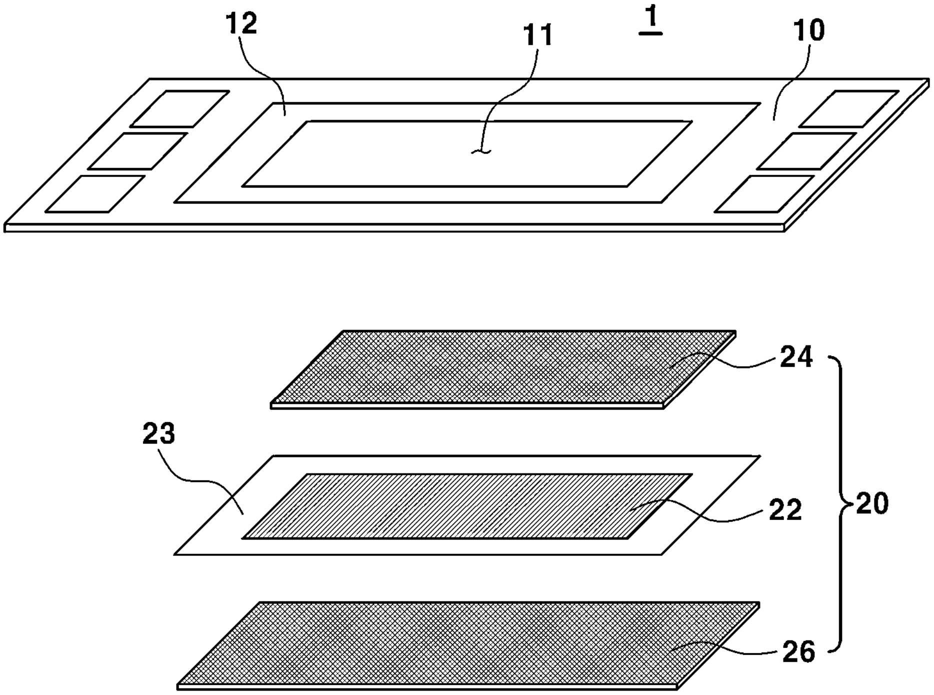
FIG. 1 shows an exploded perspective view of an EGA-cell frame assembly.

The above and other objects, features and advantages of the present disclosure should be more clearly understood from the following embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those having ordinary skill in the art.

Throughout the drawings, the same reference numerals will refer to the same or like elements. For the sake of clarity of the present disclosure, the dimensions of structures are depicted as being larger than the actual sizes thereof. It should be understood that, although terms such as "first", "second", etc. may be used herein to describe various elements, these elements are not to be limited by these terms.

These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It should be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it should be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Hereinafter, an EGA-cell frame assembly according to an aspect of the present disclosure is described in detail.

FIG. 1 schematically shows an exploded perspective view of an EGA-cell frame assembly. As shown in FIG. 1, the EGA-cell frame assembly 1 may be configured by bonding an EGA (electricity-generating assembly) 20 and a cell frame 10 to each other. The EGA 20 may be formed by bonding upper and lower GDLs (gas diffusion layers) 24, 26 to the upper and lower surfaces of an MEA (membrane electrode assembly) 22. The cell frame 10 may be made of a polymer resin, and a window 11 in which the upper GDL 24 is disposed may be formed through a center of the cell frame 10. A first bonding region 12 may be formed around the window 11 in the cell frame 10, a second bonding region 23 may be formed around the MEA 22, and an adhesive may be applied onto the first bonding region 12 and the second bonding region 23 such that the EGA 20 and the cell frame 10 may be bonded to each other.

In the EGA-cell frame assembly 1 according to an aspect of the present disclosure, the adhesive 30 bonding the EGA 20 and the cell frame 10 to each other is not particularly limited, and any adhesive, which may be selected appropriately without technical difficulty by those having ordinary skill in the art, may be used. As a non-limiting example, the adhesive 30 bonding the EGA 20 and the cell frame 10 to each other may be a film-type adhesive sheet, a hot-melt adhesive, or a UV-curable adhesive.

Figure 2A:
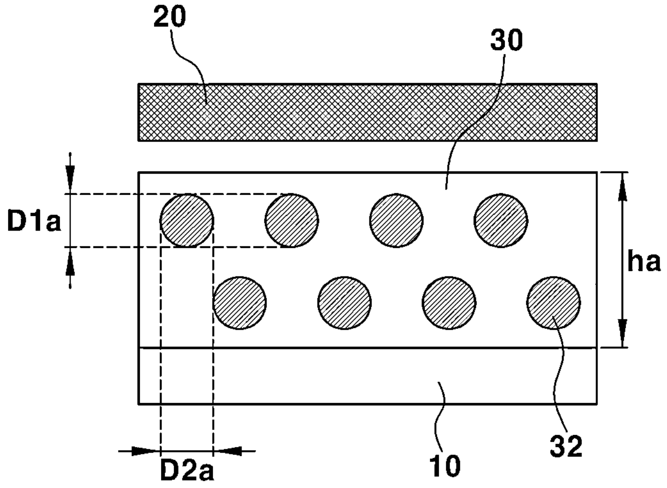
FIGS. 2A and 2B show a process of manufacturing an EGA-cell frame assembly according to an aspect of the present disclosure.
Figure 2B:
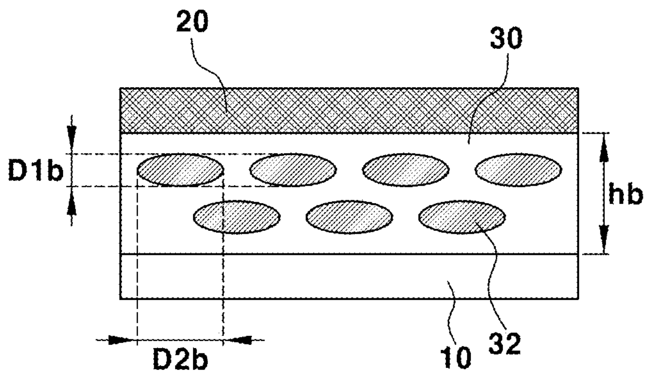

FIGS. 2A and 2B show the process of manufacturing the EGA-cell frame assembly according to an aspect of the present disclosure. FIG. 2A shows the state of the cell frame 10, the EGA 20, and the adhesive 30 before a thermocompression process, and FIG. 2B shows the state of the cell frame 10, the EGA 20, and the adhesive 30 after a thermocompression process.

The adhesive 30 used in manufacturing the EGA-cell frame assembly 1 according to an aspect of the present disclosure may include polymer particulates 32 mixed with the adhesive 30. The polymer particulates 32 may be methacrylate (PMMA), polyphenylene oxide (PPO), polycarbonate (PC), or cycloolefin copolymer (COC), but are not necessarily limited thereto.

As shown in FIG. 2A, the polymer particulates 32 mixed with the adhesive 30 have a particle shape close to a sphere. As a non-limiting example, the polymer particulates 32 may have an average particle diameter of 10 to 20 μm.

As shown in FIGS. 2A and 2B, the polymer particulates 32 after the thermocompression process have a decreased longitudinal particle diameter ($D1a>D1b$) and an increased transverse particle diameter ($D2a<D2b$) compared to before the thermocompression process, and the adhesive 30 after the thermocompression process may exhibit a tendency to decrease in thickness ($ha>hb$) compared to before the thermocompression process.

The average aspect ratio ($D1b/D2b$) of the polymer particulates 32 after the thermocompression process may fall within a range of 0.1 to 0.9. In view of adhesion quality, the average aspect ratio (D1*b*/D2*b*) of the polymer particulates 32 after the thermocompression process may be 0.9 or less, in some cases 0.8 or less, and in some cases 0.7 or less. In order to prevent damage to parts, the average aspect ratio (D1*b*/D2*b*) of the polymer particulates 32 after thermocompression may be 0.1 or more, in some cases 0.2 or more, and in some cases 0.3 or more.

In the EGA-cell frame assembly 1 according to an aspect of the present disclosure, the EGA 20 and the cell frame 10 may be bonded to each other using the adhesive 30 containing the polymer particulates 32 mixed therein, followed by a thermocompression process. Therefore, it is possible to effectively enhance bonding strength between the EGA 20 and the cell frame 10, and the adhesion quality of the adhesion portion may be effectively evaluated through a non-destructive inspection method using X-rays, as described below.

Below is a detailed description of a method of inspecting an adhesion portion in a hydrogen fuel cell according to another aspect of the present disclosure.

Figure 3:
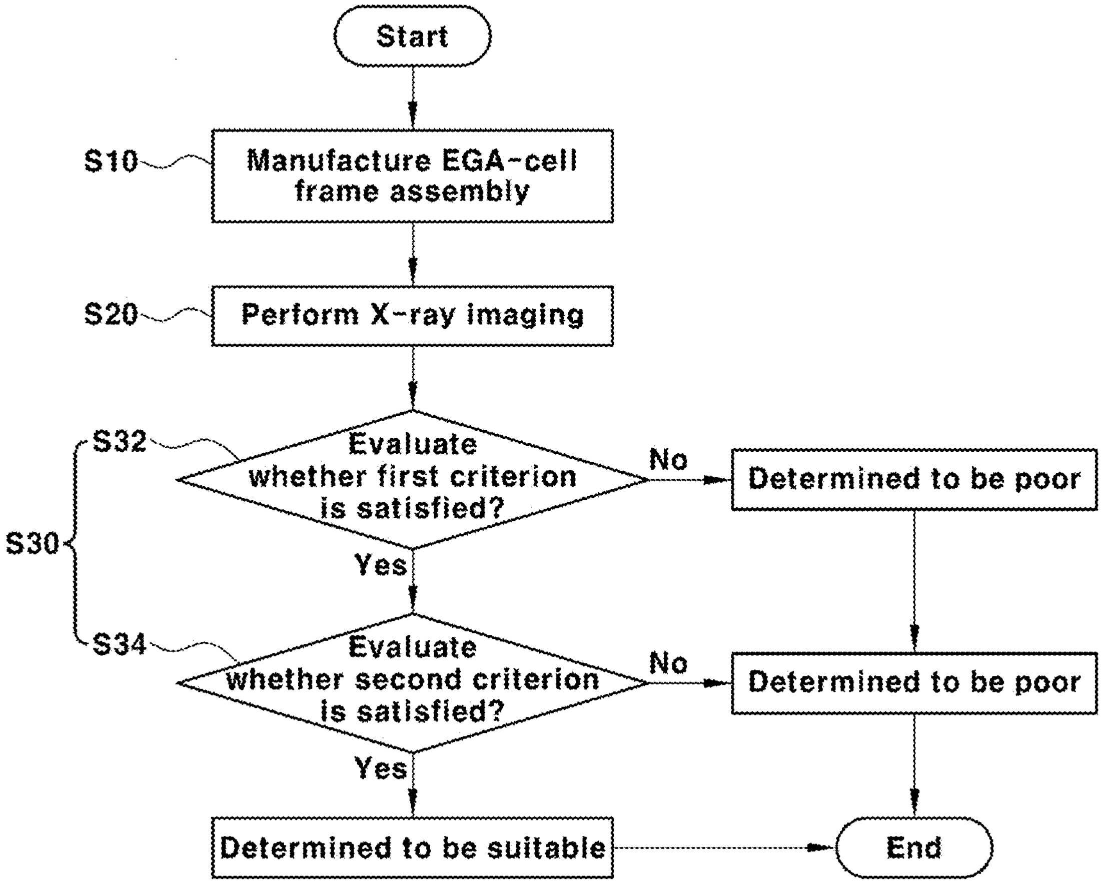
FIG. 3 shows a process of inspecting an adhesion portion in a hydrogen fuel cell according to an aspect of the present disclosure.

FIG. 3 shows a process of inspecting an adhesion portion in a hydrogen fuel cell according to an aspect of the present disclosure. As shown in FIG. 3, the method of inspecting an adhesion portion in a hydrogen fuel cell according to an aspect of the present disclosure may include manufacturing an EGA-cell frame assembly (S10), imaging polymer particulates mixed in the adhesion portion by passing X-rays through the EGA-cell frame assembly (S20), and evaluating adhesion quality of the adhesion portion based on the shape of the polymer particulates (S30).

Manufacture of EGA-Cell Frame Assembly

The EGA-cell frame assembly 1 may be manufactured by fabricating an EGA 20 from upper and lower GDLs 24, 26 and an MEA 22, bonding the EGA 20 to a cell frame 10 using an adhesive 30, and performing thermocompression. The adhesive 30 used in bonding the EGA 20 to the cell frame 10 may be an agent in which polymer particulates 32 are mixed. The components and types of the adhesive 30 are not particularly limited, and any adhesive that may be selected by those having ordinary skill in the art without technical difficulty may be used. As a non-limiting example, the adhesive 30 may be a film-type adhesive sheet, a hot-melt adhesive, or a UV-curable adhesive. The polymer particulates 32 may be polymethyl methacrylate (PMMA), polyphenylene oxide (PPO), polycarbonate (PC), or cycloolefin copolymer (COC), but are not necessarily limited thereto. The polymer particulates 32 mixed in the adhesive 30 may have a particle shape close to a sphere. As a non-limiting example, in some cases the polymer particulates 32 may have an average particle diameter of 10 to 20 μm with a spherical shape. The polymer particulates 32 may effectively contribute to enhancing adhesion of the adhesion portion formed between the EGA 20 and the cell frame 10 after thermocompression, and also to determining adhesion quality of the adhesion portion through non-destructive inspection using X-rays as described below.

X-Ray Imaging

After manufacturing the EGA-cell frame assembly 1, the adhesion portion of the EGA-cell frame assembly 1 may be imaged using an X-ray imaging device. The X-ray imaging device used in the present disclosure is not particularly limited, and any device capable of measuring the shape of the polymer particulates 32 mixed in the adhesion portion may be commonly applied.

Figure 4:
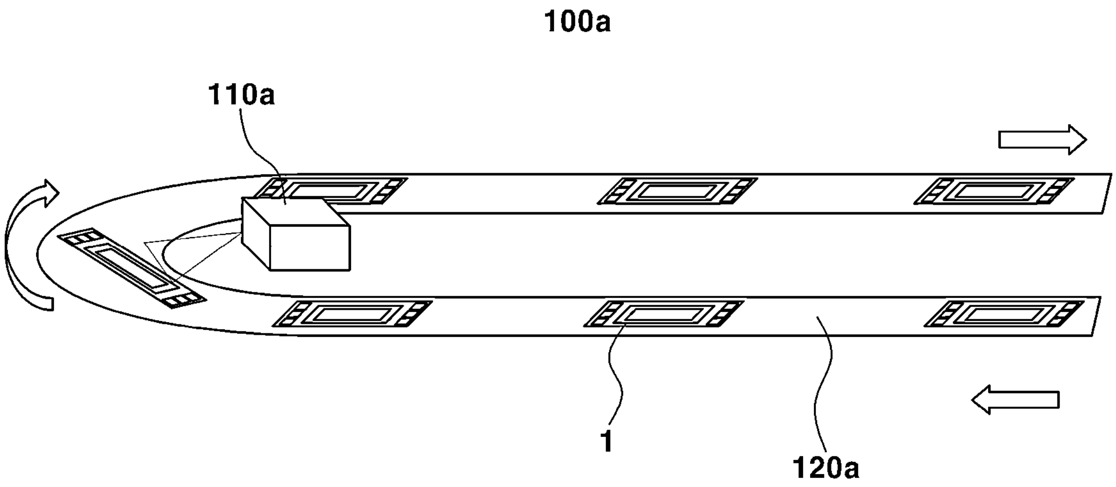
FIG. 4 shows one example of an X-ray imaging device used in the process of inspecting an adhesion portion in a hydrogen fuel cell according to an aspect of the present disclosure.
Figure 5:
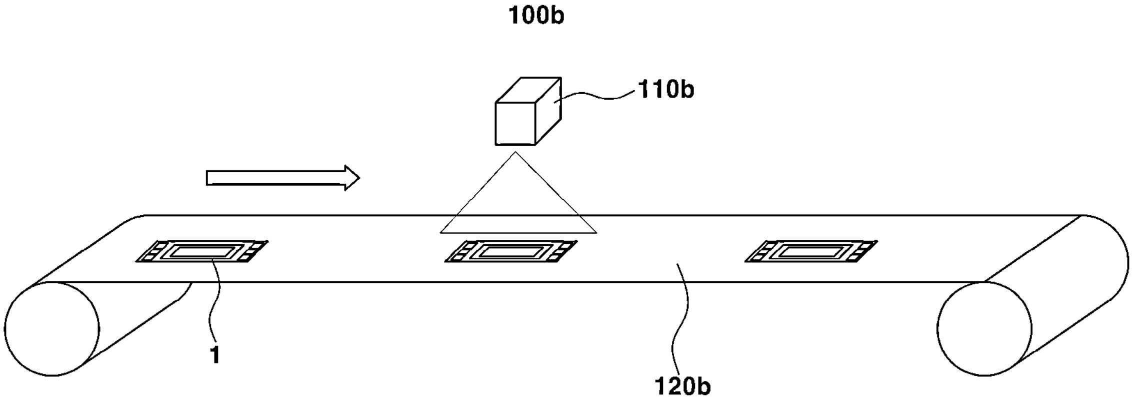
FIG. 5 shows another example of an X-ray imaging device used in the process of inspecting an adhesion portion in a hydrogen fuel cell according to an aspect of the present disclosure.

FIGS. 4 and 5 schematically show an example of an X-ray imaging device used in the process of inspecting an adhesion portion in a hydrogen fuel cell according to an aspect of the present disclosure. As shown in FIG. 4, the X-ray imaging device 100*a* may include a belt 120*a* capable of transporting the EGA-cell frame assembly 1 in one direction, and an X-ray device 110*a* capable of imaging the side end of the EGA-cell frame assembly 1 through projection may be provided to one side end of the belt 120*a*. In this example, an image of the side end of the EGA-cell frame assembly 1 through projection may be obtained, and the adhesion quality of the adhesion portion may be determined based on how much the polymer particulates 32 are compressed. As shown in FIG. 5, the X-ray imaging device 100*b* may include a belt 120*b* capable of transporting the EGA-cell frame assembly 1 in one direction, and an X-ray device 110*b* capable of imaging the EGA-cell frame assembly 1 through projection from top to bottom may be provided above the belt 120*b*. In this example, an image of the EGA-cell frame assembly 1 through projection from top to bottom may be obtained, and the adhesion quality of the adhesion portion may be determined based on how much the polymer particulates 32 are stretched. Respective robot arms (not shown) may be provided at the start and end points of each of the belts 120*a*, 120*b*. The EGA-cell frame assembly 1 may be transported onto the belt 120*a*, 120*b* by the robot arm near the start point of each of the belts 120*a*, 120*b*, and the EGA-cell frame assembly 1 after completion of evaluation may be separately loaded based on the evaluation results by the robot arm near the end point of each of the belts 120*a*, 120*b*.

Evaluation of Adhesion Quality of Adhesion Portion

In evaluating the adhesion quality of the adhesion portion (S30), the adhesion quality may be determined based on the images obtained in the X-ray imaging step (S20). Evaluating the adhesion quality of the adhesion portion (S30) may include a first evaluation step (S32) of evaluating adhesion quality based on how large the size variation of the polymer particulates 32 is and a second evaluation step (S34) of evaluating adhesion quality based on a difference in the average particle diameter of the polymer particulates 32 before and after thermocompression.

As shown in FIG. 4, when the X-ray device 110*a* is provided to perform X-ray projection at the side end of the EGA-cell frame assembly 1, in the first evaluation step (S32) and the second evaluation step (S34), the short-axis diameter of the polymer particulates 32 may be measured and used for evaluation. Also, as shown in FIG. 5, when the X-ray device 110*b* is provided to perform X-ray projection at the upper surface of the EGA-cell frame assembly 1, in the first evaluation step (S32) and the second evaluation step (S34), the long-axis diameter of the polymer particulates 32 may be measured and used for evaluation.

In the first evaluation step (S32), it is possible to determine how large the size variation of the polymer particulates 32 is by measuring individual particle diameters of the particles 32, the images of which are obtained within the imaging regions. Specifically, the maximum particle diameter (Dmax) and the minimum particle diameter (Dmin) among the particles 32, the images of which are obtained, are measured, and the average particle diameter (Deq) of all the particles 32, the images of which are obtained, is measured. Then, after calculating the particle size difference (ΔDm=Dmax−Dmin) between the maximum particle diameter (Dmax) and the minimum particle diameter (Dmin), adhesion is determined to be good when the particle size difference (ΔDm) is smaller than the average particle diameter (Deq), and the second evaluation step may be conducted. When the particle size difference (ΔDm) is greater than the average particle diameter (Deq), adhesion is determined to be poor, and the second evaluation step (S34) may not proceed any further. When the particle size difference (ΔDm) is greater than the average particle diameter (Deq), a phenomenon in which the polymer particulates 32 are agglomerated in a specific region during mixing or in which pressure is intensively applied only to a specific region during thermocompression may occur, making it impossible to achieve uniform adhesion in the adhesion portion.

In the second evaluation step (S34), adhesion quality may be evaluated based on a difference in the average particle diameter of the polymer particulates 32 before and after thermocompression. The average particle diameter (Do) of the polymer particulates 32 before thermocompression may be measured in advance before mixing of the polymer particulates 32, and the average particle diameter (Do) may be determined by measuring the particle diameter of the polymer particulates 32 before mixing by those having ordinary skill in the art without technical difficulty.

As shown in FIG. 4, where the X-ray device 110*a* is provided to perform X-ray projection at the side end side of the EGA-cell frame assembly 1, the state of adhesion of the adhesion portion may be determined to be good when the compression rate R1 represented by Relational Expression 1 below falls in the range of 10 to 50%. If the compression rate R1 is less than 10%, the effect of addition of the polymer particulates 32 is insignificant, whereas if the compression rate R1 exceeds 50%, damage to parts may occur.

$$R1=(Do-Deq)*100/Do \qquad \text{[Relational Expression 1]}$$

In Relational Expression 1, Do represents the average particle diameter (μm) of the polymer particulates 32 before mixing, and Deq represents the average short-axis particle diameter (μm) of the polymer particulates 32 as measured from the X-ray images.

As shown in FIG. 5, where the X-ray device 110*b* is provided to perform X-ray projection at the upper surface of the EGA-cell frame assembly 1, the state of adhesion of the adhesion portion may be determined to be good when the elongation R2 represented by Relational Expression 2 below falls in the range of 10 to 50%. If the elongation R2 is less than 10%, the effect of addition of the polymer particulates 32 is insignificant, whereas if the elongation R2 exceeds 50%, damage to parts may occur.

$$R2=(Deq-Do)*100/Deq \qquad \text{[Relational Expression 2]}$$

In Relational Expression 2, Do represents the average particle diameter (μm) of the polymer particulates 32 before mixing, and Deq represents the average long-axis particle diameter (μm) of the polymer particulates 32 as measured from the X-ray images.

Only the EGA-cell frame assembly 1 determined to have good adhesion in the first evaluation step (S32) and the second evaluation step (S34) may be used to manufacture a stack for a hydrogen fuel cell.

A better understanding of the present disclosure regarding the EGA-cell frame assembly may be obtained through the following examples and comparative examples. These examples are merely set forth to illustrate the present disclosure, and are not to be construed as limiting the scope of the present disclosure.

Test Example 1

In order to confirm the effect of reducing elastic recovery due to the addition of polymer particulates and heat treatment, the elastic recovery evaluation test of an adhesive without polymer particulates and an adhesive with polymer particulates was conducted, and the results thereof are shown in Table 1 below. PC-polyurethane was used as the adhesive, and a PMMA filler having an average particle diameter of 10 μm was used as the polymer particulates. In Comparative Example 1, the adhesive (PC-polyurethane) was used alone, and in Test Example 1, 60 to 70 wt % of the adhesive (PC-polyurethane) and 30 to 40 wt % of the PMMA filler were mixed. Heat treatment was performed at a temperature for a period of time commonly applied in the manufacture of the EGA-cell frame assembly, and the elastic recovery is the indentation elastic modulus (Eit) based on the nanoindenter (ISO 14577, ASTM E-2546) measurement results.

TABLE 1

| Classification | | Comparative Example 1 PC-polyurethane | Test Example 1 PC-polyurethane + PMMA filler |
|---|---|---|---|
| Elastic recovery (Eit) [GPa] | Before heat treatment | 0.052 | 0.111 |
| | After heat treatment | 1.336 | 0.100 |
| | Change | −2469% | +10% |

As shown in Table 1, in Comparative Example 1 in which the polymer particulates were not added, the elastic recovery after heat treatment was increased and thus adhesion was decreased, whereas in Test Example 1 in which the polymer particulates were added, the elastic recovery after heat treatment was decreased, effectively contributing to enhancing adhesion.

Test Example 2

In order to confirm the effect of enhancing adhesion due to the addition of the polymer particulates and compression, the adhesion evaluation test of an adhesive without polymer particulates and an adhesive with polymer particulates was conducted. PC-polyurethane was used as the adhesive, and a PMMA filler having the same compression rate as the adhesive and an average particle diameter of 10 μm was used as the polymer particulates. Condition 1 is the case in which the adhesive (PC-polyurethane) was used alone, and Condition 2 is the case in which 60 to 70 wt % of the adhesive (PC-polyurethane) and 30 to 40 wt % of the PMMA filler were mixed. Adhesion was measured with a universal testing machine (UTM), and damage to parts was visually evaluated. Different compression rates were applied to individual test specimens, and after compression, adhesion and damage to parts of the test specimens were evaluated, and the results thereof are shown in Table 2 below.

TABLE 2

| Compression conditions | | | | | | |
|---|---|---|---|---|---|---|
| Adhesive thickness before compression | Adhesive thickness after compression | Compression rate | Adhesion Condition 1 | Adhesion Condition 2 | Damage to parts | Classification |
| 50 μm | 50 μm | 0% | 0.2N/cm | 0.1N/cm | No damage | Comparative Example 2 |
| 50 μm | 45 μm | 10% | 4.1N/cm | 5.8N/cm | No damage | Example 1 |
| 50 μm | 40 μm | 20% | 4.3N/cm | 5.5N/cm | No damage | Example 2 |
| 50 μm | 20 μm | 60% | 6.1N/cm | 7N/cm | GDL damage | Comparative Example 3 |
| 50 μm | 10 μm | 80% | 1.8N/cm | 1.5N/cm | GDL damage | Comparative Example 4 |

In Examples 1 and 2, it was confirmed that adhesion was enhanced due to the addition of the PMMA filler and also that damage to parts did not occur. In contrast, in Comparative Example 2 in which compression was not performed, there was no effect of enhancing adhesion due to the addition of the PMMA filler, and in Comparative Examples 3 and 4 in which compression was excessively performed, GDL damage occurred.

As is apparent from the above description, according to an aspect of the present disclosure, it is possible to provide a non-destructive inspection method that can effectively evaluate adhesion quality of an adhesion portion between a cell frame and an EGA without damage to parts or deterioration in durability or adhesiveness of parts.

According to another aspect of the present disclosure, it is possible to provide an EGA-cell frame assembly that can effectively evaluate the adhesion quality of the adhesion portion between the cell frame and the EGA by the non-destructive inspection method.

The effects of the present disclosure are not limited to the above-mentioned effects. It should be understood that the effects of the present disclosure include all effects that can be inferred from the description of the present disclosure.

As described above, although the examples have been described with reference to the limited embodiments and drawings, various modifications and variations are possible from the above description by those having ordinary skill in the art. For example, even if the described techniques are performed in an order different from the described method, and/or the described components are coupled or combined in a different form from the described method, or are replaced or substituted by other components or equivalents, appropriate results may be achieved. Therefore, other implementations, other embodiments, and equivalents to the claims also fall within the scope of the following claims.

What is claimed is:

1. A method of inspecting an adhesion portion in a hydrogen fuel cell, the method comprising:
- providing an electricity-generating assembly (EGA)-cell frame assembly by applying an adhesive mixed with polymer particulates between an EGA and a cell frame and then subjecting the EGA and the cell frame to thermocompression;
- imaging a shape of the polymer particulates in an adhesion portion by passing X-rays through the adhesion portion formed between the EGA and the cell frame; and
- evaluating adhesion quality of the adhesion portion based on the shape of the polymer particulates,
- wherein the adhesive does not comprise a metallic additive.

2. The method of claim 1, wherein, in providing the EGA-cell frame assembly, the polymer particulates having an average particle diameter of 10 to 20 μm are mixed in the adhesive and then the adhesive is applied onto one surface of the cell frame and/or one surface of the EGA.

3. The method of claim 2, wherein the adhesive comprises a film-type adhesive sheet, a hot-melt adhesive, a UV-curable adhesive, or combinations thereof.

4. The method of claim 1, wherein the polymer particulates comprise polymethyl methacrylate (PMMA), polyphenylene oxide (PPO), polycarbonate (PC), cycloolefin copolymer (COC), or combinations thereof.

5. The method of claim 1, wherein evaluating the adhesion quality of the adhesion portion comprises:
- a first evaluation step of evaluating whether a difference between a maximum particle diameter and a minimum particle diameter among the polymer particulates imaged in imaging the shape of the polymer particulates satisfies a first criterion; and
- a second evaluation step of evaluating whether a difference between an average particle diameter of the polymer particulates imaged in imaging the shape of the polymer particulates and an average particle diameter of the polymer particulates provided in the adhesive satisfies a second criterion.

6. The method of claim 5, wherein the second evaluation step is performed when the first evaluation step is satisfied.

7. The method of claim 5, wherein, in imaging the shape of the polymer particulates, when X-rays are radiated onto a lateral surface of the EGA-cell frame assembly, whether the first criterion and the second criterion are satisfied is evaluated based on a short-axis diameter of the polymer particulates.

8. The method of claim 5, wherein, in imaging the shape of the polymer particulates, when X-rays are radiated onto an upper surface or a lower surface of the EGA-cell frame assembly, whether the first criterion and the second criterion are satisfied is evaluated based on a long-axis diameter of the polymer particulates.

9. An electricity-generating assembly (EGA)-cell frame assembly comprising:
- an EGA comprising a membrane electrode assembly (MEA) and a gas diffusion layer (GDL);
- a cell frame comprising a polymer resin; and
- an adhesion portion bonding the EGA and the cell frame to each other, wherein the adhesion portion comprises an adhesive and polymer particulates mixed with the adhesive, and wherein the adhesion portion does not comprise a metallic additive.

10. The EGA-cell frame assembly of claim 9, wherein the adhesive comprises a film-type adhesive sheet, a hot-melt adhesive, a UV-curable adhesive, or combinations thereof.

11. The EGA-cell frame assembly of claim 9, wherein the polymer particulates comprise polymethyl methacrylate (PMMA), polyphenylene oxide (PPO), polycarbonate (PC), cycloolefin copolymer (COC), or combinations thereof.

12. The EGA-cell frame assembly of claim 9, wherein the polymer particulates in the adhesion portion have a compressed shape when viewed in cross-section.

* * * * *